United States Patent
Kiriyama

[11] Patent Number: 5,949,051
[45] Date of Patent: Sep. 7, 1999

[54] MAGNETIC ENCODER USING A DISPLACEMENT DETECTING CIRCUIT THEREOF

[75] Inventor: Tetsuro Kiriyama, Kawasaki, Japan

[73] Assignee: Mitutoyo Corporation, Kawasaki, Japan

[21] Appl. No.: 08/958,153

[22] Filed: Oct. 27, 1997

[30] Foreign Application Priority Data

Nov. 1, 1996 [JP] Japan ................................. 8-291794

[51] Int. Cl.[6] ................................................ G06K 7/08
[52] U.S. Cl. ........................ 235/449; 235/439; 235/450; 235/493; 902/27
[58] Field of Search .................................. 235/449, 375, 235/439, 447, 450, 493, 494; 902/27

[56] References Cited

U.S. PATENT DOCUMENTS

| | | | |
|---|---|---|---|
| 4,418,372 | 11/1983 | Hayashida | 360/113 |
| 4,490,674 | 12/1984 | Ito | 324/208 |
| 4,845,456 | 7/1989 | Abe et al. | 338/32 R |
| 4,968,864 | 11/1990 | Doi et al. | 235/449 X |
| 5,036,276 | 7/1991 | Aizawa | 235/449 X |
| 5,036,319 | 7/1991 | Shiraki et al. | 341/15 |
| 5,057,678 | 10/1991 | Ichikawa | 235/449 |
| 5,179,475 | 1/1993 | McClure | 360/17 |
| 5,272,573 | 12/1993 | McClure | 360/17 |
| 5,289,122 | 2/1994 | Shigeno | 235/449 X |
| 5,325,056 | 6/1994 | Shonowaki et al. | 324/207.21 |
| 5,448,419 | 9/1995 | Bigelow et al. | 310/17 |
| 5,451,759 | 9/1995 | Hoshino et al. | 235/449 |
| 5,821,517 | 10/1998 | Fedeli et al. | 235/449 |
| 5,889,403 | 3/1999 | Kawase | 324/249 |

FOREIGN PATENT DOCUMENTS

| | | |
|---|---|---|
| 0112463 | 7/1984 | European Pat. Off. . |
| 0 479 525 A2 | 4/1992 | European Pat. Off. . |
| 39 39 278 C1 | 6/1991 | Germany . |

*Primary Examiner*—Michael G. Lee
*Attorney, Agent, or Firm*—Oliff & Berridge, PLC

[57] ABSTRACT

A magnetic encoder that allows the power consumption to be reduced has a first member 1 magnetized at pitches $\lambda$ and a second member 2 disposed so as to be relatively movable to the first member 1. The second member 2 has at least four MR devices Ma1, Mb1, Ma2, and Mb2 with phases that differ from by $\lambda/4$ each. The MR devices Ma1, Mb1, Ma2, and Mb2 are connected as a bridge circuit. Thus, a displacement detecting circuit 30 that outputs two-phase sine wave signals INA and INB is structured. The detecting circuit 30 is intermittently activated by analog switches Sa1, Sb1, Sa2, and Sb2 driven by a first clock CK1. The output signals INA and INB of the detecting circuit 30 are sampled by sample hold circuits 41*a* and 41*b*, respectively. The sampled values are compared by comparators 42*a* and 42*b*, whereby binary data is obtained. The comparators 42*a* and 42*b* each have a bias circuit 44 that is intermittently driven by a second clock CK2.

14 Claims, 11 Drawing Sheets ly arranged in predetermined pitches, a second member, disposed opposite to the first member so as to be relatively movable to the first member, the second member having at least four magnetoresistance devices with phases that differ from by 90° each corresponding to the pitches of the magnetic poles of the first member,

MAGNETIC ENCODER USING A DISPLACEMENT DETECTING CIRCUIT THEREOF

BACKGROUND OF THE INVENTION

1. Field of the Invention

The present invention relates to a magnetic encoder for use with slide calipers, a micrometer, and so forth, in particular, to a magnetic encoder for detecting a variation of magnetic coupling of members that relatively move so as to detect the relative displacement (positions) thereof.

2. Prior Art

As an example of an encoder that detects the position, angle, and so forth of members that relatively moves, a magnetic encoder is known. A magnetic encoder comprises a first member and a second member. The first member has N pole portions and S pole portions that are arranged alternately at predetermined pitches $\lambda$. The first member is for example a magnetic scale. The second member is disposed so as to be relatively movable to the first member. The second member has devices that detect the variation of the magnetic field corresponding to the relative movement of the members. For example, first to fourth magnetoresistance (MR) devices with phases that differ from by $\lambda/4$ (=90°) each are disposed corresponding to the pitches (magnetizing pitches) $\lambda$ of the magnetic scale.

The first to fourth MR devices on the second member are connected in such a manner that MR devices with phases that differ from by 180° are connected in series. With the first to fourth MR devices connected in such a manner, a displacement detecting circuit is structured as a bridge circuit. The first to fourth MR devices are magnetized in the longitudinal direction perpendicular to the direction of the movement of the member. With the interaction of DC currents supplied to these MR devices and the horizontal magnetic field of the magnetic scale, the magnetization is rotated, thereby causing the resistance of these MR devices to vary. The intensity of the horizontal magnetic field applied to each MR device periodically varies at the pitches $\lambda$ corresponding to the relative movement. Thus, the rotation angle of the magnetization periodically varies. Consequently, sine wave signals with phases that differ from by 90° are obtained from output terminals of the bridge circuit. By processing the sine wave signals, the amount of displacement can be obtained.

In a magnetic encoder having such MR devices, the influence of water, cutting oil, and so forth to output signals is smaller than that in an electrostatic type encoder and a photoelectric type encoder. Thus, the magnetic encoder is especially suitable for applications that require environmental resistance as in a machining plant.

When the magnetic encoder is used for a battery-driven hand-tool length measuring unit or the like, the power consumption is a critical problem. In other words, a DC power supply is connected to the MR devices that compose the displacement detecting circuit. Thus, a drive current is supplied from the DC power supply to the MR devices. For example, when the resistance of each MR device is 1.5 k $\Omega$ and the applied voltage is 1.5 V, since the total resistance of the bridge circuit is 1.5 k $\Omega$, the current that flows in the bridge circuit amounts to 1 mA. Thus, for example, the service life of a silver-oxide button type battery of 160 mAh is as small as 160 hours (around 6.5 days).

In such a magnetic encoder, as a substrate on which MR devices are formed, a glass substrate or a ceramic substrate is used. On the other hand, when a signal processing circuit that processes output signals of the MR devices is structured as an IC chip, to dispose the integrated circuit and the MR devices, there are several methods such as methods (a) and (b). In the method (a), a substrate on which MR devices are formed and a substrate on which an integrated circuit is formed are connected with a flexible print circuit (FPC) board. In the method (b), an IC chip is disposed on the rear surface of a substrate on which MR devices are patterned.

However, in the conventional mounting methods, since the mounting size is large, it is difficult to accomplish a small hand-tool. Although the mounting density in the method (b) where one substrate is used in common is larger than the mounting density in the method (a) where two substrates on which MR devices and an integrated circuit are formed, since the MR devices and the integrated circuit use different areas, the reduction of the size is restricted. In addition, the surface on which the MR devices are formed should be disposed as a reference surface opposite to the magnetic scale with a predetermined gap. However, when the integrated circuit is disposed, the reference surface cannot be precisely obtained. When the MR devices are disposed opposite to the magnetic scale, the protecting structure against contamination becomes complicated.

The conventional magnetic encoder having MR devices with different phases are largely affected by fluctuation of the accuracy of the magnetizing pitches and intensity of magnetic field, fluctuation of the positions, shapes, and characteristics of the MR devices, and so forth. Thus, on the electric signal processing circuit side, the center voltage, amplitude, and so forth of the sine wave signals should be adjusted. In addition, since the magnetic encoder is largely affected by a damage and contamination of MR device pattern, the stability and reliability thereof are not high. Moreover, as the magnetizing pitches of the scale is becoming small, it is difficult to dispose four MR devices in the magnetizing pitches. Thus, when the MR devices are precisely machined, the fluctuation of characteristics thereof becomes large.

SUMMARY OF THE INVENTION

An object of the present invention is to provide a magnetic encoder that allows the power consumption to decrease and that can be applied to a battery-driven hand-tool with a long service life.

Another object of the present invention is to provide a magnetic encoder that allows desired characteristics to be provided without need to perform adjustments, the power consumption to be decreased, and that precise machining conditions of MR devices to be alleviated.

A first aspect of the present invention is a magnetic encoder, comprising a first member having N pole portions and S pole portions alternately arranged in predetermined pitches, a second member, disposed opposite to the first member so as to be relatively movable to the first member, the second member having at least four magnetoresistance devices with phases that differ from by 90° each corresponding to the pitches of the magnetic poles of the first member, a displacement detecting circuit for obtaining the difference between output signals of the magnetoresistance devices with phases that differs by 180° to output two-phase sine wave signals, the amplitudes of the two-phase sine wave signals being varied corresponding to the relative movement of the first member and the second member, the displacement detecting circuit being driven by a DC power supply, a signal processing circuit for generating two-phase square wave signals bases on the two-phase sine wave signals obtained by the displacement detecting circuit, a counter for counting the two-phase square wave signals obtained by the signal processing circuit to obtain relative position of the first member and the second member, and a switch circuit for intermittently turning on/off the output of the DC power supply to the displacement detecting circuit corresponding to a first clock having a predetermined frequency.

According to the present invention, since a power is intermittently supplied to the displacement detecting circuit composed of MR devices and thereby the displacement detecting circuit is activated, the current consumption of the MR devices decreases corresponding to the duty ratio of the first clock in comparison with the conventional system of which a current is always supplied to the MR devices. Thus, when the magnetic encoder according to the present invention is applied to a battery-driven hand-tool length measuring device, the service life of the battery (including a solar cell) can be prolonged.

The signal processing circuit has a pair of sample hold circuits for sampling and holding the two-phase sine wave signals obtained by the displacement detecting circuit corresponding to the first clock, a pair of comparators, intermittently activated corresponding to a second clock with a phase delayed from the phase of the first clock, for comparing output signals of the sample hold circuits with a constant reference voltage to obtain binary data, and a pair of flip-flops for receiving the binary data from the comparators to output the two-phase square wave signals. With the comparator that is intermittently activated, the power consumption thereof can also be reduced. In particular, when the second clock that causes the comparators to intermittently operate has a phase that is delayed from the phase of the first clock, until the sampled value is settled, the comparators are kept inactive. Thus, the effect of the power reduction becomes large.

In the case that the comparators are intermittently activated, while the comparators are being inactive, the output signals of the comparators become unstable. To solve this problem, flip-flops that are always in on-state are disposed on the output side of the comparators, whereby the output signals of the comparators are stored. Thus, the problem is solved and two-phase square wave signals can be output.

In addition, the signal processing circuit may have an interpolation circuit that performs an electric interpolating process for the output signals of the sample hold circuits to output two-phase square wave signals. In this case, it is preferable to intermittently activate the interpolation circuit with the second clock that has a phase delayed from the phase of the first clock. In addition, when amplifying circuits are disposed at one of input/output terminals of the sample hold circuits, it is preferable to intermittently activate the amplifying circuits with the first clock. With the interpolation circuit and the amplifying circuits which are intermittently driven, the power consumption can be effectively reduced.

In addition, according to the present invention, when the displacement detecting circuit is intermittently driven, two-phase sine wave signals are sampled. Thus, it is not necessary to provide sample hold circuits. In addition, it is not always necessary to provide a second clock along with a first clock that causes the switch circuit to drive. Moreover, the output signal of the displacement detecting circuit that is intermittently driven by the first clock can be processed by the comparators that are intermittently activated with the first clock. Thus, in such a simple structure, signals can be processed with low power consumption.

Furthermore, according to the present invention, when a signal processing circuit, a counter, and a switch circuit are disposed on the second member and when a display that displays the output value of the counter is disposed, a hand-tool length measuring device that is battery-driven with a long service life can be obtained.

A second aspect of the present invention is a magnetic encoder, comprising a first member having N pole portions and S pole portions alternately arranged in predetermined pitches, a second member, disposed opposite to the first member so as to be relatively movable to the first member, the second member having at least four magnetoresistance devices with phases that differ from by 90° each corresponding to the pitches of the magnetic poles of the first member, a displacement detecting circuit for obtaining the difference between output signals of the magnetoresistance devices with phases that differs by 180° to output two-phase sine wave signals, the amplitudes of the two-phase sine wave signals being varied corresponding to the relative movement of the first member and the second member, the displacement detecting circuit being driven by a DC power supply, a signal processing circuit for generating two-phase square wave signals based on the two-phase sine wave signals obtained by the displacement detecting circuit, and a counter for counting the two-phase square wave signals obtained by the signal processing circuit to obtain relative positions of the first member and the second member, wherein a plurality of sets, each of which is composed of at least four magnetoresistance devices whose phase are 90° shifted each other, are arranged, and wherein the magnetoresistance devices with the same phase in the sets are connected as magnetic detecting devices in series.

According to the present invention, when a plurality of MR devices are connected in series and used as one magnetic detecting device, the deviation of magnetization and the deviation of the shapes and characteristics of the MR devices are equalized, whereby the influence thereof is decreased. Thus, it is not necessary to electrically adjust the center voltage and amplitude of the output signal with a signal processing circuit. In addition, it is not necessary to adjust the resistance of each resistor by a trimming method or the like. Thus, the displacement of members can be detected at high S/N ratio without need to perform adjustments. Moreover, the influences of the deterioration of the intensity of magnetization, the damage of the MR device pattern, and the contamination due to a substance with high permeability such as iron powder are alleviated. Thus, a magnetic encoder that stably operates and that has high reliability can be obtained. As the impedance as the magnetic detecting device increases, the power consumption of the magnetic encoder is reduced. In addition, when the pitches of the MR devices are set to 3/4 or 5/4, the precise machining conditions for the MR devices can be alleviated.

These and other objects, features and advantages of the present invention will become more apparent in light of the following detailed description of best mode embodiments thereof, as illustrated in the accompanying drawings.

DETAILED DESCRIPTION OF THE PREFERRED EMBODIMENTS

Figure 1:
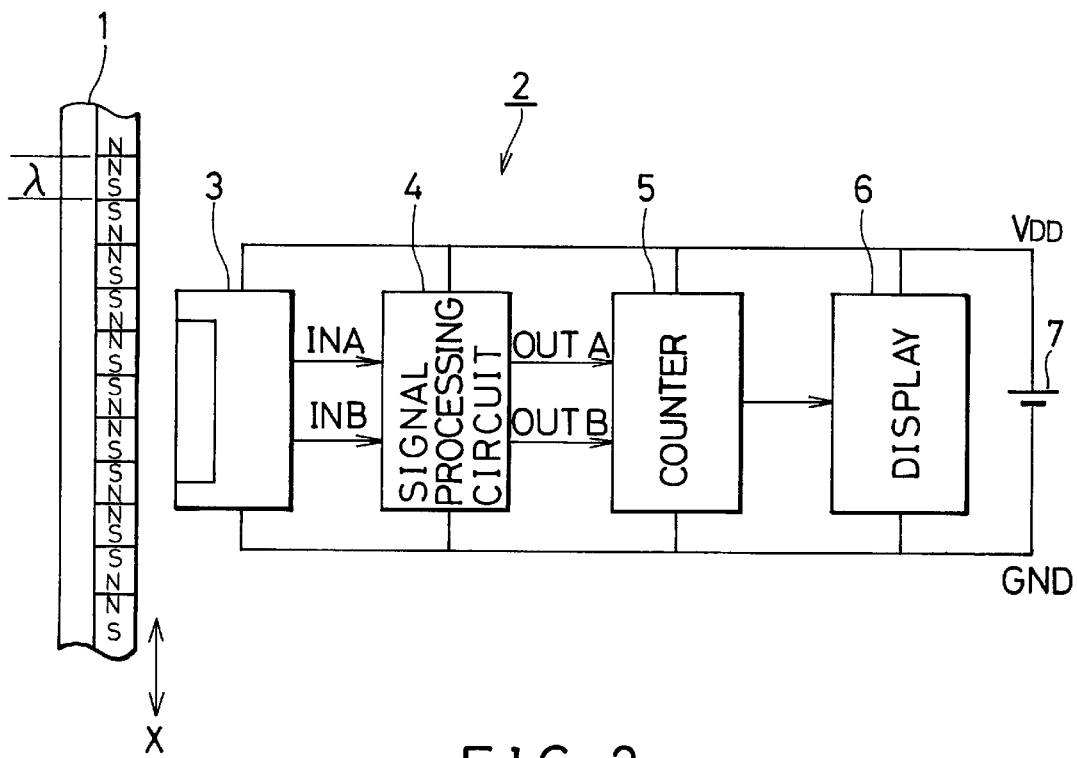
FIG. 1 is a circuit diagram showing the structure of a magnetic encoder according to an the embodiment of the present invention.

A magnetic encoder according to a first embodiment of the present invention comprises a first member 1 and a second member 2. The first member 1 has N pole portions and S pole portions arranged alternately at pitches $\lambda$. The first member 1 composes a magnetic scale. The second member 2 is disposed opposite to the first member in such a manner the second member 2 is relatively movable to the first member 1 in the direction denoted by arrow x. The second member 2 is a detecting head 3, a signal processing circuit 4, a counter 5, a display 6, and a battery 7. The detecting head 3 is disposed opposite to a scale surface on which magnetic pole portions are arranged of the first member with a predetermined gap. The detecting head 3 has MR devices that detect the variation of the magnetic field corresponding to the relative movement to the first member 1. The signal processing circuit 4 processes two-phase sine wave signals INA and INB received from the detecting head 3 to generate two-phase square wave signals OUTA and OUTB. The counter 5 counts the two-phase square wave signals OUTA and OUTB received from the signal processing circuit 4. The display 6 that is such as an LCD displays the counted value. The battery 7 supplies a DC power to each circuit portion.

Figure 2:
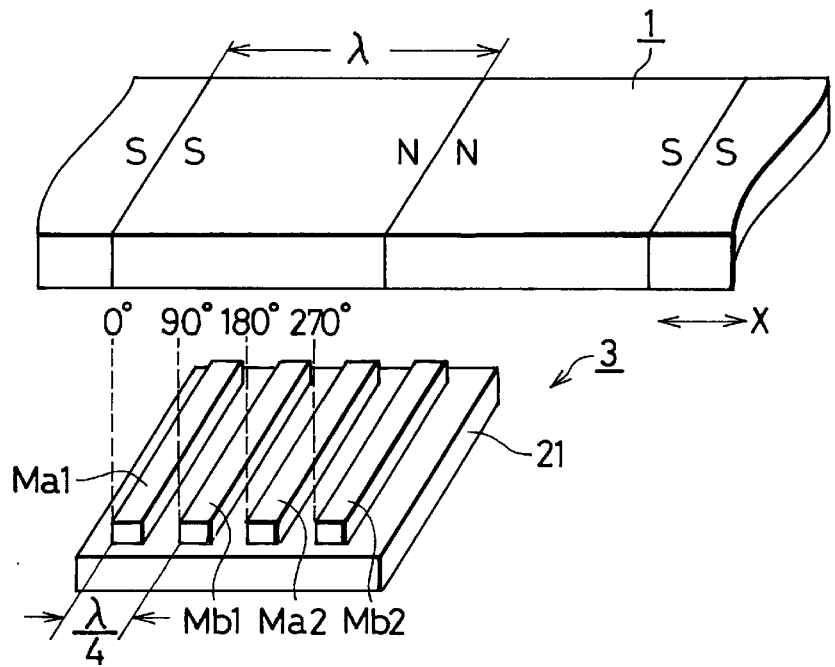
FIG. 2 is a schematic diagram showing the structure of a detecting head according to the embodiment of the present invention.

FIG. 2 is a schematic diagram showing the structure of principal portions of the detecting head 3 corresponding to the first member 1. As described above, the first member 1 is magnetized at pitches $\lambda$. The detecting head 3 comprises a substrate 21 and at least four MR devices Ma1, Mb1, Ma2, and Mb2 formed thereon. The MR devices Ma1, Mb1, Ma2, and Mb2 are elongated resistors that have terminals at ends in the direction perpendicular to the direction of relative displacement denoted by arrow x. The MR devices Ma1, Mb1, Ma2, and Mb2 are arranged at pitches of ($\lambda/4$) in contrast to the magnetizing pitches $\lambda$ of the first member 1. In other words, the pitches of the MR devices Ma1, Mb1, Ma2, and Mb2 differ from by 90° each. The MR devices Ma1, Mb1, Ma2, and Mb2 are magnetoresistance thin film devices composed by for example spatter method. The MR devices Ma1, Mb1, Ma2, and Mb2 are fully coated with a protection film (not shown).

Figure 3:
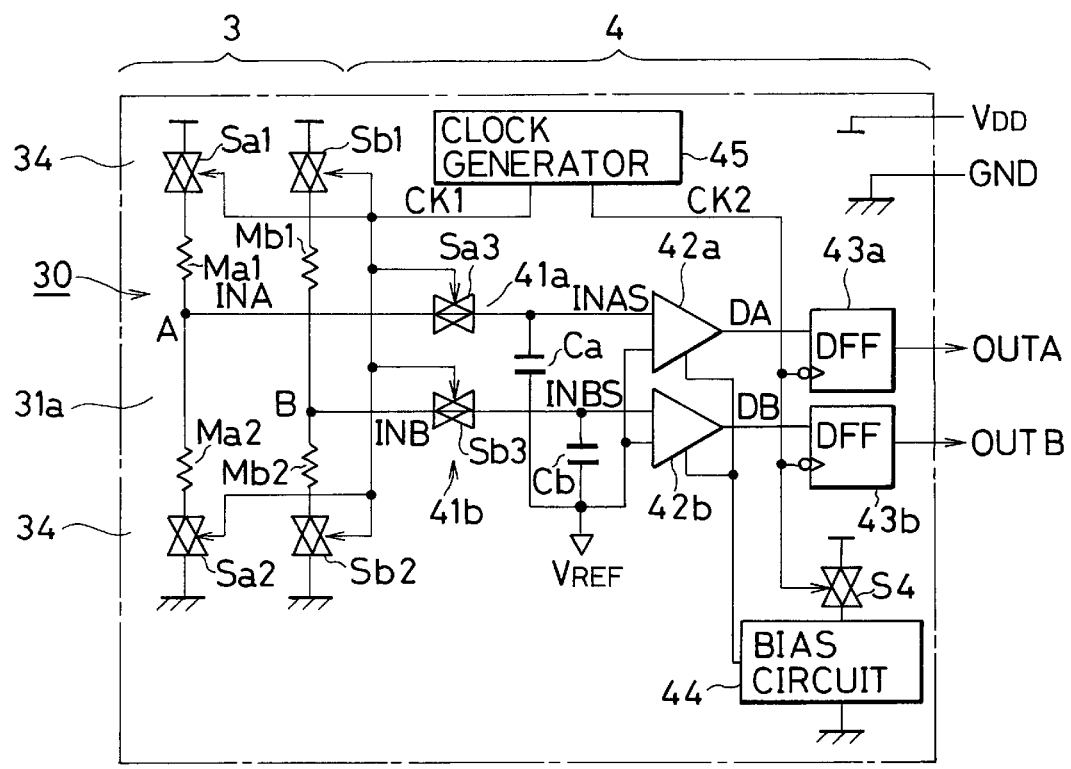
FIG. 3 is a circuit diagram showing the detecting head and a signal processing circuit according to the embodiment of the present invention.

FIG. 3 is a schematic diagram showing an equivalent circuit of the detecting head 3 and the signal processing circuit 4. A displacement detecting circuit 30 that outputs the two-phase sine wave signals INA and INB is composed by use of the four MR devices Ma1, Mb1, Ma2, and Mb2 and disposed on the detecting head 3. In this embodiment, the first and third MR devices Ma1 and Ma2 with phases that differ from each other by 180° are connected in series between a DC power supply VDD and a ground GND. Likewise, the second and fourth MR devices Mb1 and Mb2 with phases that differ from each other by 180° are connected in series between the power supply VDD and the ground GND. With the four MR devices Ma1, Mb1, Ma2, and Mb2, a bridge circuit 31a is structured. Two output terminals A and B are output terminals of the two-phase sine wave signals INA and INB, respectively.

In this embodiment, as a switch circuit 34 that intermittently supplies the power of the DC power supply VDD to the displacement detecting circuit 30, analog switch devices Sa1, Sa2, Sb1, and Sb2 are disposed at the power supply terminals and the ground terminals of the MR devices. The switch devices Sa1, Sa2, Sb1, and Sb2 are selectively turned on at predetermined intervals with a first clock CK1 that is received from a clock generating circuit 45 and that has a predetermined frequency.

The signal processing circuit 4 comprises a pair of sample hold circuits 41a and 41b, a pair of comparators 42a and 42b, and a pair of D-type flip-flops 43a and 43b. The sample hold circuits 41a and 41b sample and hold the two-phase sine wave signals INA and INB received from the displacement detecting circuit 30. The comparators 42a and 42b compare these sampled values with a reference voltage VREF and output binary data DA and DB, respectively. The D-type flip-flops 43a and 43b receive the binary data DA and DB and output two-phase square signals OUTA and OUTB, respectively. The sample hold circuits 41a and 41b comprise switch devices S3a and S3b and capacitors Ca and Cb, respectively. The switch devices S3a and S3B are used for the sampling operations and controlled with the first clock CK1 received from the clock generator 45. The capacitors Ca and Cb store the sampled values.

A bias circuit 44 for the comparators 42a and 42b is connected to the power supply VDD through an analog switch device S4. The analog switch device S4 is turned on/off with a second clock CK2 received from the clock generator 45. The second clock CK2 synchronizes with the first clock CK1 and has a slight delay therefrom. Thus, the comparators 42a and 42b are intermittently activated with a slight delay from the displacement detecting circuit 30. The flip-flops 43a and 43b are always on state. Data is obtained from the flip-flops 43a and 43b with the second clock CK2.

Next, the operation of the magnetic encoder structured in such a manner will be described in the following.

Figure 4:
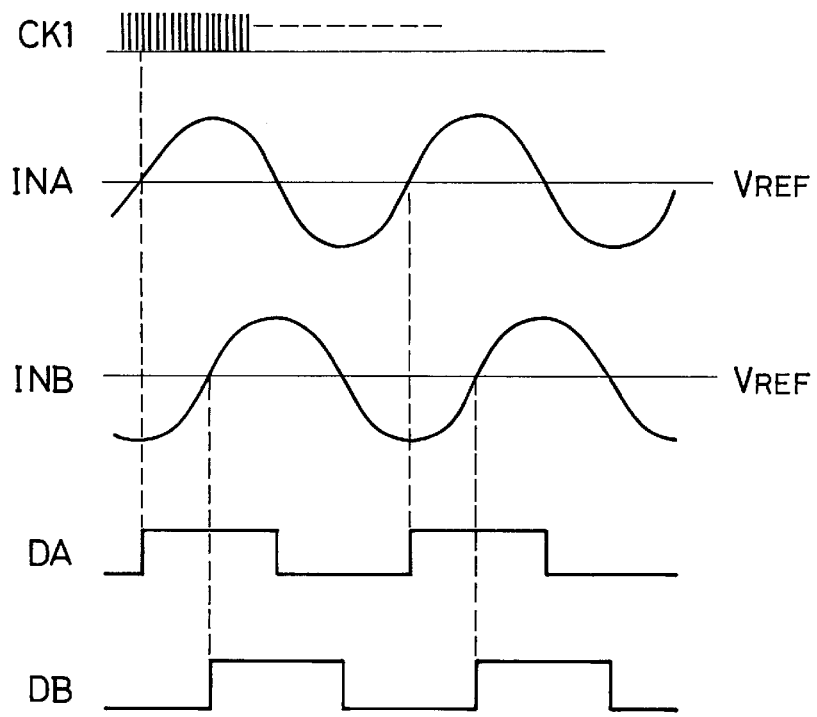
FIG. 4 is a timing chart showing an outline of the operation according to the embodiment of the present invention.

FIG. 4 is a timing chart showing an outline of the operation of the magnetic encoder. The displacement detecting circuit 30 outputs the two-phase sine wave signals INA and INB with phases that differ from each other by 90° and whose amplitudes vary corresponding to the relative displacement of the first and second members. Actually, the two-phase sine wave signals INA and INB are chopped by the first clock CK1. However, for convenience, the two-phase sine wave signals INA and INB are continuously shown in FIG. 4. The two-phase sine wave signals INA and INB are sampled by the sample hold circuits 41a and 41b with the first clock CK1. The sampled values are compared with the reference voltage VREF by the comparators 42a and 42b. Thus, the binary data DA and DB that become "H" in the case that the sampled values exceed the reference voltage VREF are obtained from the two-phase sine wave signals INA and INB, respectively.

Figure 5:
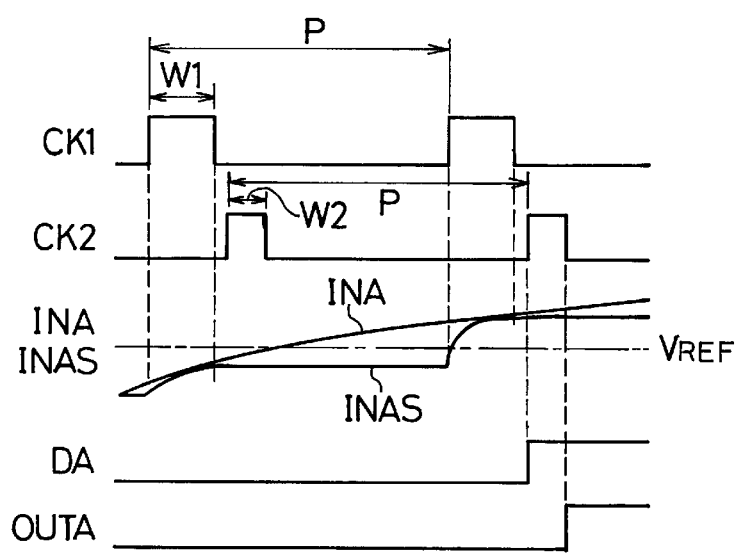
FIG. 5 is an enlarged timing chart of FIG. 4.

FIG. 5 is a timing chart that enlarges the range of the horizontal axis (time axis of which one period corresponds to the amount of displacement of pitches λ) with respect to the sine wave signal INA. While the first clock CK1 is in "H" state, a power is supplied to the displacement detecting circuit 30. The resultant sine wave signal INA is sampled. Thereafter, the first clock CK1 becomes "L". Thus, the sampled value INAS is settled. Next, the second clock CK2 becomes "H". Only while the second clock CK2 is in the "H" state, the bias circuit 44 is activated, whereby the comparators 42a and 42b are activated. Thus, the comparators 42a and 42b compare the sampled value INAS with the reference voltage VREF. Thus, when the sampled value INAS exceeds the reference voltage VREF, the second clock CK2 becomes "H". Thus, the binary data DA is obtained. When the second clock CK2 becomes "L", the binary data DA is supplied to the flip-flop 43a. Thus, the square wave signal OUTA is obtained. This operation applies to the operation of which the square wave signal OUTB is obtained from the sine wave signal INB.

The periods of the first clock CK1 and the second clock CK2 should be sufficiently small in contrast to the relative speed (scale speed) between the first member 1 and the second member 2. In other words, the scale speed is restricted corresponding to the periods P of the first clock CK1 and the second clock CK2. When the maximum value of the scale speed is denoted by vmax, the condition of vmax <(λ/2)/P should be satisfied. When the condition is satisfied, an error detection can be prevented.

In this embodiment, since the comparators 42a and 42b are intermittently operated, output signals thereof sometimes become unstable. However, with the flip-flops 43a and 43b that hold the binary data DA and DB, the two-phase square wave signals OUTA and OUTB do not become unstable.

According to the embodiment, since the displacement detecting circuit 30 and the comparators 42a and 42b are intermittently operated, the current consumption is decreased. In reality, assuming that the resistance of each MR device is 1.5 k Ω and the applied voltage thereto is 1.5 V, in the conventional system, a current of 1.5 V/1.5 k Ω=1000 μA flows in a displacement detecting circuit as a bridge circuit composed of four MR devices. Assuming that the current consumption of the comparators is 100 μA, a current of 1100 μA flows in total.

On the other hand, assuming that the "H" period of the first clock CK1 is W1=10 μs, the "H" period of the second clock CK2 is W2=1 μs, and the periods of the clocks CK1 and CK2 are P=10 ms, the ratio of the current consumption of the displacement detecting circuit 30 composed of four MR devices to the conventional system is equal to the duty ratio W1/P=1/1000. Likewise, the ratio of the current consumption of the comparators is W2/P=1/10,000. When the same clock source as the system clock of the counter 5 is used, the clock generating circuit 45 can be accomplished by only a simple digital circuit. Thus, such current consumption can be ignored. In addition, the current consumption of the analog switch devices is ignorable in comparison with that of the MR devices. Thus, according to the embodiment, it is clear that the current consumption can be remarkably decreased.

Consequently, according to the present invention, a hand-tool length measuring device that can be driven with a battery for a long time can be accomplished. In addition, heat generation due to the power consumption of the MR devices and the detecting circuit can be suppressed. Thus, it is convenient to measure the displacement of an object that is temperature sensitive. Furthermore, the MR devices and the displacement detecting circuit is less drifted because their heat generations are small. Thus, the displacement of an object can be measured without need to wait until the temperature becomes stable after the power of the apparatus is turned on. Moreover, the displacement of an object can be accurately measured for a long time. Furthermore, since the total current that flows in the MR devices decreases, the corrosive resistance thereof can be improved.

In the embodiment shown in FIG. 3, analog switches are disposed on the power supply side terminals and the ground side terminals of the MR devices. When the ON resistance of the analog switch devices cannot be ignored, with resistors having the same ON resistance on both the power supply side and the ground side, the influence of the ON resistance can be canceled. When the ON resistance of the analog switch devices can be ignored, the analog switch devices can be disposed on either the power supply side or the ground side.

Figures 6A, 6B, 6C:
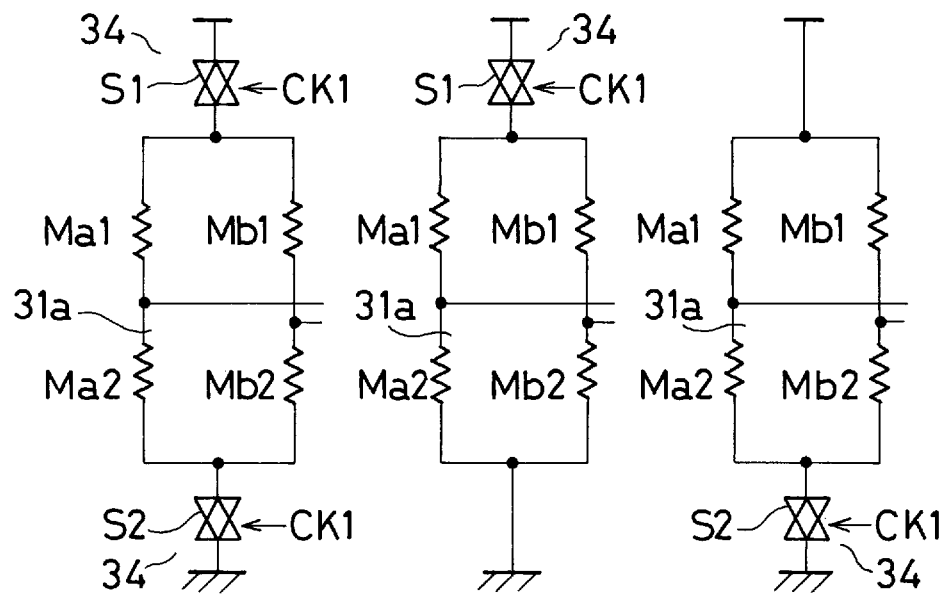
FIGS. 6A to 6C are circuit diagrams showing examples of the structure of a displacement detecting circuit according to another embodiment of the present invention.

FIGS. 6A to 6C show other examples of the structure of the switch circuit 34 that turns on/off the power supplied to the displacement detecting circuit 30. In FIG. 6A, analog switch devices S1 and S2 are disposed on the power supply side and the ground side of the bridge circuit 31a, respectively. When analog switch devices with low ON resistance are used, the structure shown in FIG. 6A is effective. On the other hand, as shown in FIGS. 6B and 6C, one of the analog switch devices S1 and S2 shown in FIG. 6A can be omitted.

Figure 7:
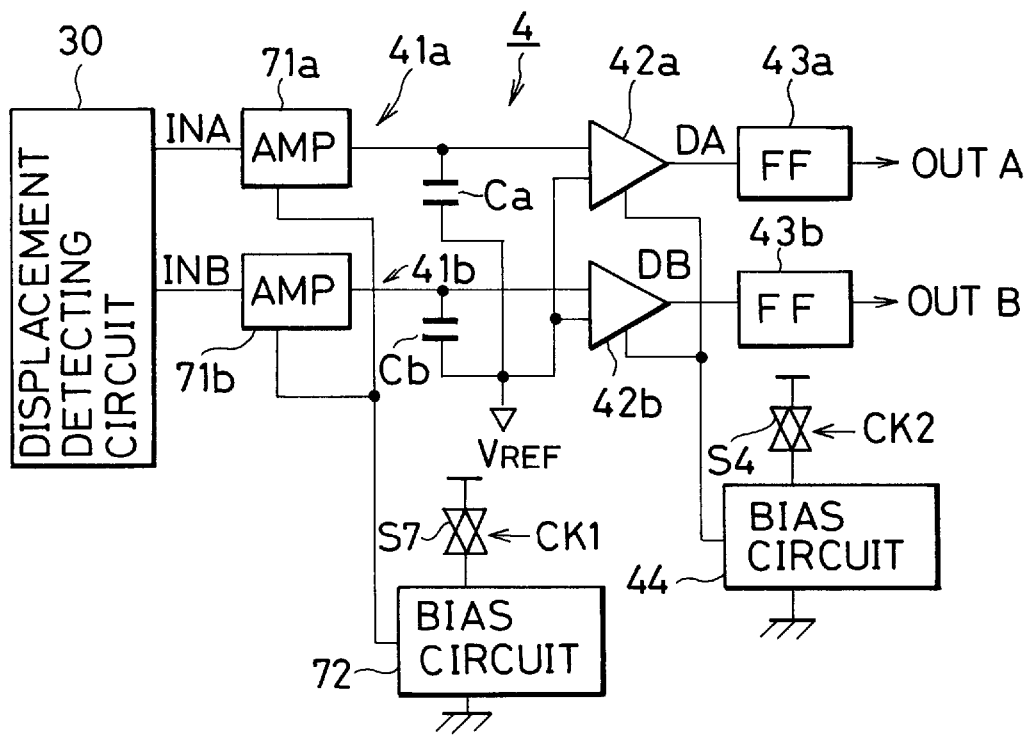
FIG. 7 is a circuit diagram showing the structure of a signal processing circuit according to another embodiment of the present invention.

FIG. 7 shows the structure of a signal processing circuit 4 according to another embodiment of the present invention.

In this embodiment, pre-amplifiers 71a and 71b are disposed in an output stage of a displacement detecting circuit 30 (namely, in the respective input stages of sample hold circuits 41a and 41b). The pre-amplifiers 71a and 71b are intermittently activated by a bias circuit 72 that is operated by an analog switch device S7 that is turned on with a first clock CK1. The pre-amplifiers 71a and 71b that are intermittently operated function as sampling circuits. The intermittent operations of the pre-amplifiers 71a and 71b suppress the increase of the current consumption thereof.

In the case that the pre-amplifiers 71a and 71b are disposed on the output terminal side of the sample hold circuits 41a and 41b, when the pre-amplifiers 71a and 71b are intermittently operated, the power consumption can be suppressed.

Figure 8:
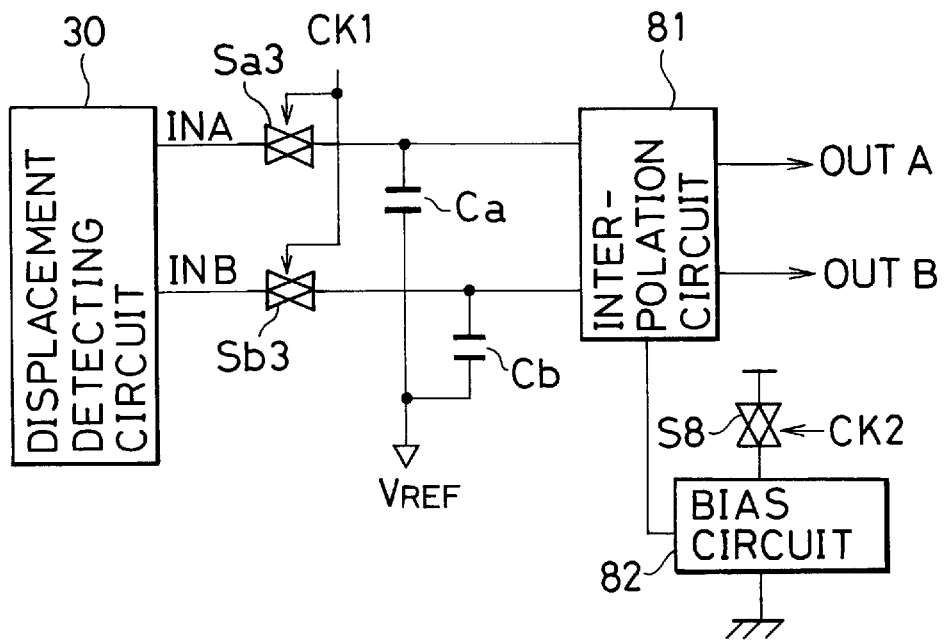
FIG. 8 is a block diagram showing the structure of a signal processing circuit according to another embodiment of the present invention.

In the two-phase square wave generating system using only the comparators according to the above-described embodiment, the number of interpolations is four. To accomplish higher resolution, a special interpolation circuit instead of the comparators is required. FIG. 8 is a circuit diagram showing a structure having an interpolation circuit 81 according to another embodiment of the present invention. Various interpolating systems are known. As a typical example, a resistor dividing method is known. In this case, the interpolation circuit 81 comprises a resistor array, a plurality of operational amplifiers, a comparator, and a logic circuit. As with the comparators 42a and 42b of the above-described embodiment, in the embodiment shown in FIG. 8, at least the operational amplifiers and the comparator of the interpolation circuit 81 have a bias circuit 82 that is activated by an analog switch device S8 that is turned on with a second clock CK2. Thus, the power consumption of the interpolation circuit 81 can be suppressed.

The system that has the interpolation circuit 81 can be applied to the structure that has the amplifiers 71a and 71b as with the embodiment shown in FIG. 7.

Figure 9:
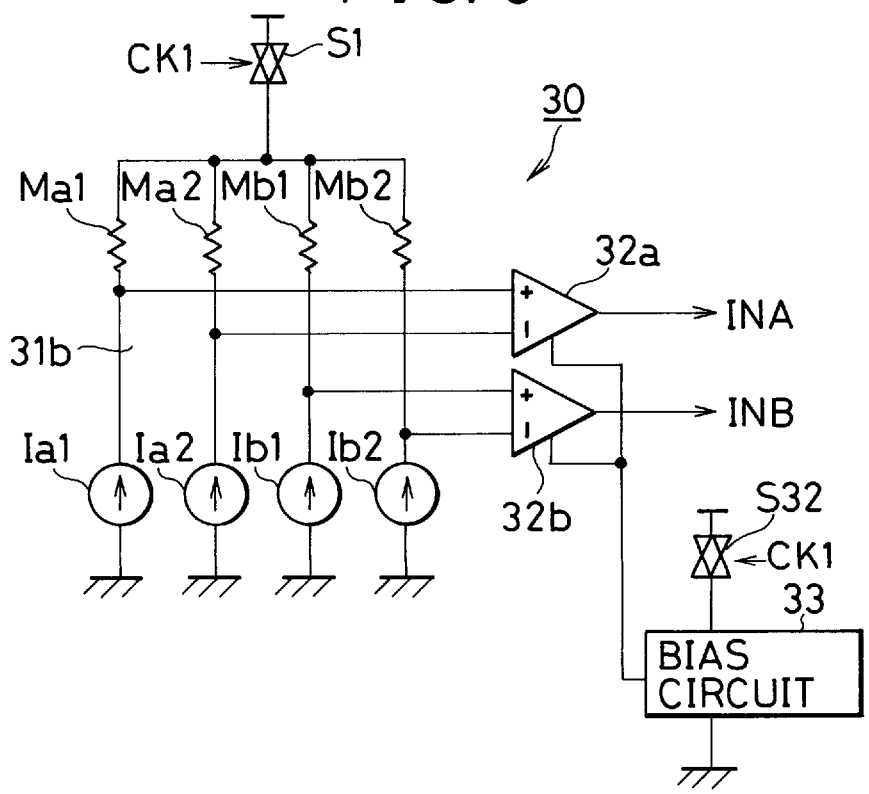
FIG. 9 is a circuit diagram showing the structure of a displacement detecting circuit according to another embodiment of the present invention.

In the above-described embodiment shown in FIG. 3, the displacement detecting circuit 30 is constructed as a bridge circuit 31a of four MR devices. However, without need to use the bridge circuit, the displacement detecting circuit 30 can be structured. FIG. 9 shows the structure of the displacement detecting circuit 30 according to another embodiment of the present invention. The displacement detecting circuit 30 has a sense circuit 31b of which four magnetoresistance devices Ma1 to Mb2 are connected to a DC power supply through respective current sources Ia1 to Ib2. Connection nodes of the magnetoresistance devices Ma1 to Mb2 and the current sources Ia1 to Ib2 are output terminals. Output terminals of the sense circuit 31b are connected to two differential amplifying circuits 32a and 32b that obtain differences of output signals with phases that differ from each other by 180°. In other words, the differential amplifying circuit 32a detects and amplifies the difference of the output signals of the MR devices Ma1 and Ma2 with phases 0° and 180°. The other differential amplifying circuit 32b detects and amplifies the difference of the output signals of the MR devices Mb1 and Mb2 with phases 90 and 270. As with the above-described embodiment shown in FIG. 3, the MR devices Ma1 to Mb2 are intermittently driven by a common analog switch device S1 (or separate switches). In the embodiment shown in FIG. 9, a bias circuit 33 that has an analog switch device S32 driven with the fist clock CK1 is disposed so as to intermittently activate the two differential amplifying circuits 32a and 32b.

Figure 10:
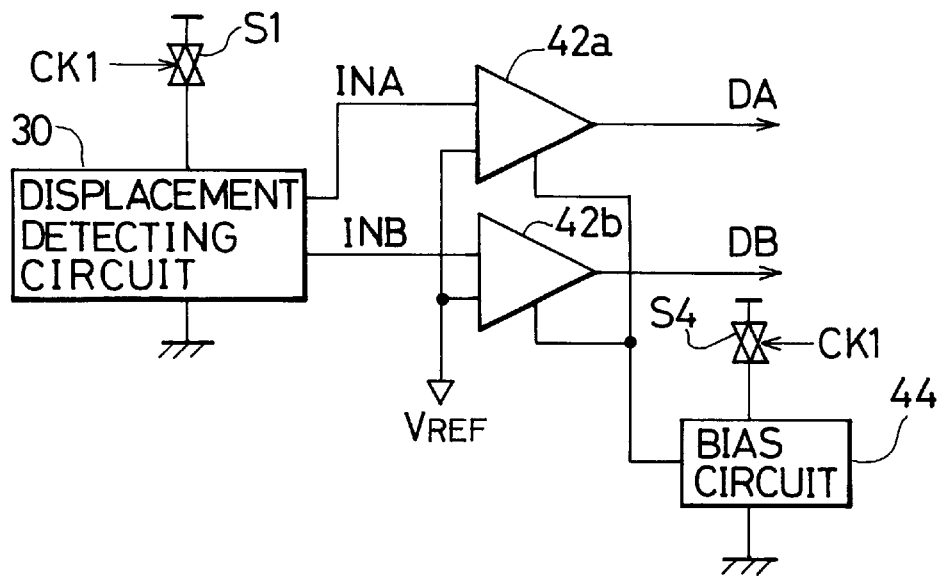
FIG. 10 is a circuit diagram showing the structure of a signal processing circuit according to another embodiment of the present invention.

FIG. 10 is a block diagram showing the structure according to another embodiment of the present invention. In FIG. 10, since a detecting circuit 30 is intermittently driven with a first clock CK1, the detecting circuit 30 serves as a sampling circuit. Thus, in this embodiment, without providing sample hold circuits, two-phase sine wave signals INA and INB received from the detecting circuit 30 are directly supplied to comparators 42a and 42b, respectively. A switch S4 of a bias circuit 44 that intermittently activates the comparators 42a and 42b is driven with the first clock CK1. As with the above-described embodiment shown in FIG. 3, output signals DA and DB of the comparators 42a and 42b are supplied to flip-flops.

Figure 11:
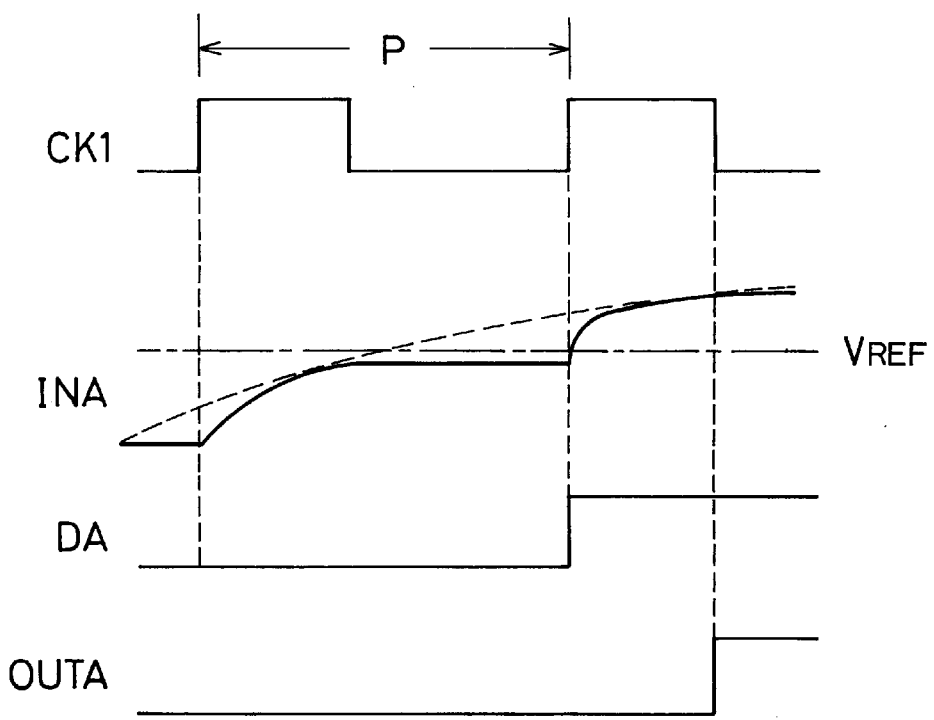
FIG. 11 is a timing chart showing the operation of FIG. 5 according to the embodiment of FIG. 10.

FIG. 11 shows waveforms of signals in the embodiment shown in FIG. 10 according to the embodiment of FIG. 10.

According to the embodiment shown in FIG. 10, since one clock rather than two clocks is used without need to use a sample hole circuit, the signal processing circuit can be simply structured.

Figure 12:
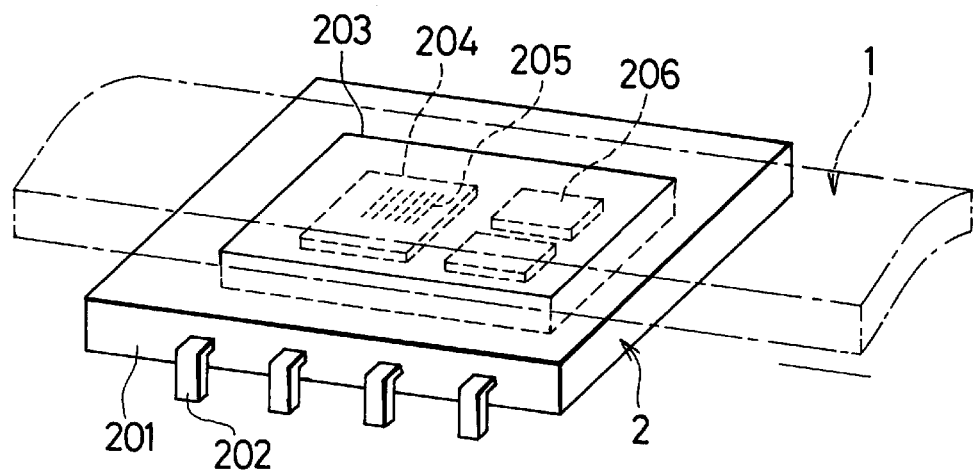
FIG. 12 is a schematic diagram showing the structure of a magnetic encoder according to another embodiment of the present invention.
Figure 13:
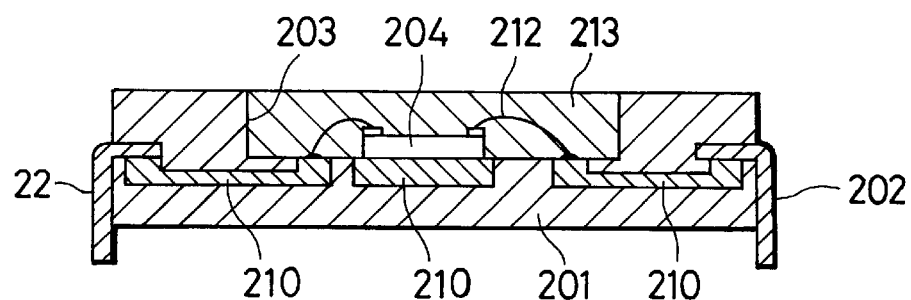
FIG. 13 is a sectional view showing the structure of a second member according to the embodiment of the present invention.

FIG. 12 is a schematic diagram showing the structure of a magnetic encoder as a linear encoder according to a second preferred embodiment of the present invention. In this embodiment, a second member 2 is composed of an insulation substrate 201. The insulation substrate 201 is a multi-layered ceramic substrate produced by for example green sheet method. As shown with a sectional view of FIG. 13, inner wiring lines 210 and lead terminals 202 are formed. A concave portion 203 is formed on the insulation substrate 201 opposite to a first member 1. An IC chip 204 including a signal processing circuit and another part 206 are disposed in the concave portion 203. As will be described later, MR devices 205 are patterned on the front surface of the IC chip 204. A terminal pad is connected to wiring lines 210 on the substrate with for example bonding wires 212. The concave portion 203 having the IC chip 204 is sealed with a resin 213 so that the height of the concave portion 203 becomes the same as the height of the peripheral portion of the substrate 201.

Figure 14:
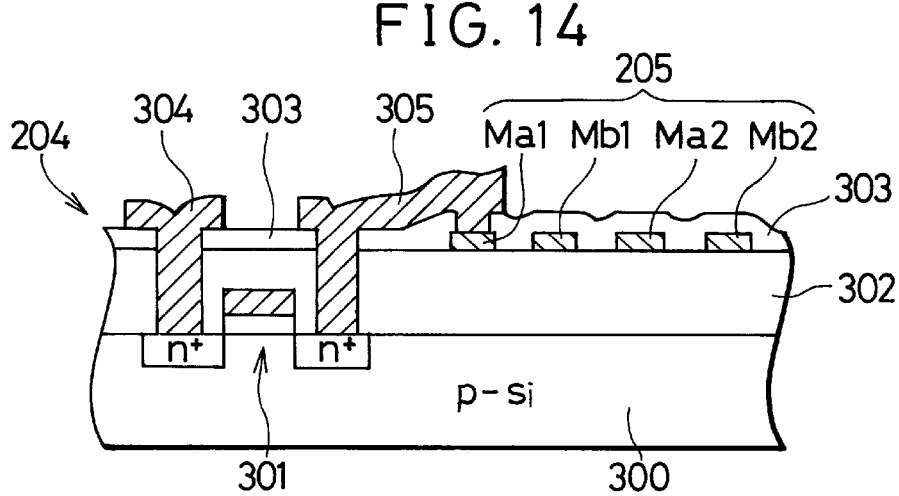
FIG. 14 is a sectional view showing the structure of an IC chip according to the embodiment of the present invention.

FIG. 14 is a sectional view showing the structure of principal portions of the IC chip 204. The IC chip 204 has a silicon substrate 300 and MOS transistors 301 and so forth integrally formed thereon. The surface of the IC chip 204 is coated with an insulation layer 302 composed of a silicon oxide film. The insulation layer 302 is preferably flattened by a flattening technology. A plurality of MR devices (Ma1, Ma2, Mb1, and Mb2) 205 opposite to the first member 1 are arranged as an array on the insulation layer 302. The MR devices 205 are formed by patterning a magnetoresistance thin film such as permalloy by spatter method.

The magnetoresistance thin film of the MR devices 205 should be spattered at a temperature of several hundreds ° C. on the substrate. Thus, after metal wiring lines composed of such as Al are formed as the IC chip 204, it is not preferable to sputter the magnetoresistance thin film. Therefore, according to the embodiment shown in FIG. 14, after the MR devices 205 are patterned on the insulation layer 34, metal wiring lines 304 that connect devices of the IC chip 204 are formed. In reality, after the MR devices 205 are formed and then a protection film 303 that protects the MR devices 205 is formed, contact holes are formed by a lithography method, whereby the metal wiring lines 305 are formed. The metal wiring lines 305 are used to mutually connect the MR devices 205 and connect the MR devices 205 and devices of the IC chip 204 along with mutually connecting devices of the IC chip 204.

Figure 15:
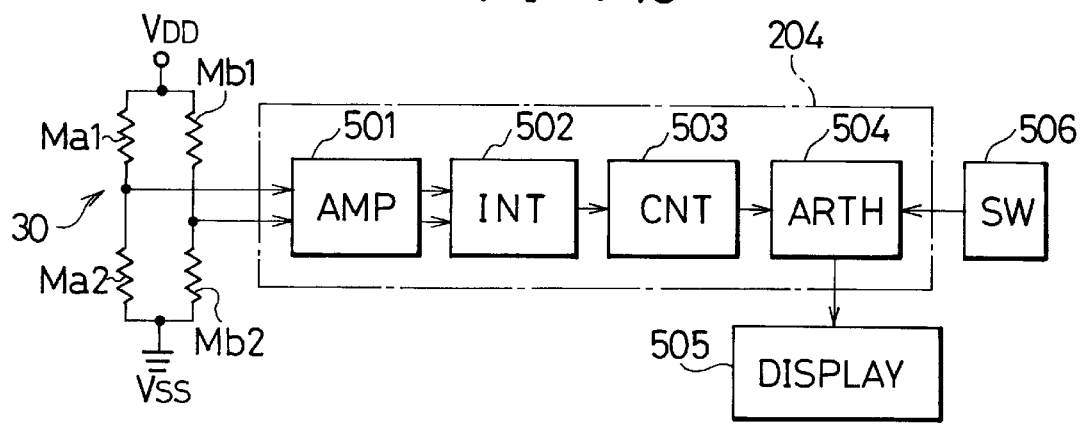
FIG. 15 is a schematic diagram showing an equivalent circuit of the magnetic encoder according to the embodiment of the present invention.

FIG. 15 is a schematic diagram showing an equivalent circuit of a magnetic encoder according to the embodiment shown in FIG. 12. In this embodiment, the IC chip 204 includes a signal amplifying circuit 501, an interpolation circuit 502, a counter 503, and an arithmetic operation circuit 504. In reality, as will be described later, a plurality of sets of four-phase MR devices 205 are disposed on the IC chip 204. For simplicity, FIG. 15 shows a displacement detecting circuit 30 composed of a bridge circuit of four MR devices Ma1, Ma2, Mb1, and Mb2. As was described in the embodiment shown in FIG. 3, the four MR devices have four phases 0°, 90°, 180°, and 270° corresponding to the magnetizing pitches $\lambda$ of the first member 1. Thus, at two bridge output terminals, two sine wave signals INA and INB with phases that differ from each other by 90° is obtained. Unlike with the embodiment shown in FIG. 3, in the embodiment shown in FIG. 15, a displacement detecting circuit 30 is not intermittently driven. However, the displacement detecting circuit 30 may be intermittently driven. This applies to each circuit of the IC chip 204.

As shown in FIG. 15, the entire system further comprises a display 50, a power supply, and various switches 506. The display 50 displays a displacement output. FIG. 15 shows an example of the structure of the IC chip 204. In other words, the IC chip 505 may include only the amplifying circuit 501.

Next, an array of MR devices 205 will be described. MR devices should be arranged so that the pitches thereof is set to satisfy the following relation:

$$P=(2N+1)\lambda/4 \text{(where } N=0, 1, 2,)$$

m sets (m≧2) of four MR devices with four phases that differ from by 90° each (=$\lambda$/4) are arranged.

Figure 16:
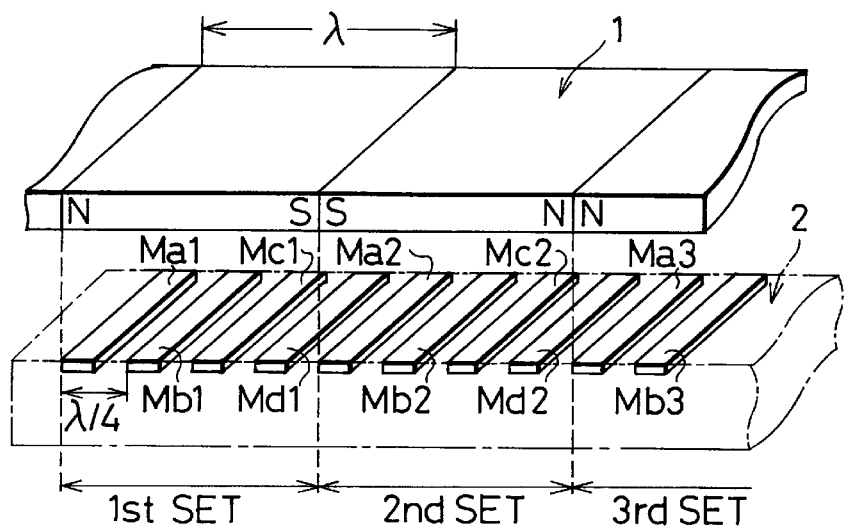
FIG. 16 is a perspective view showing the relation of relative phases of a second member and a first member according to the embodiment of the present invention.
Figure 17:
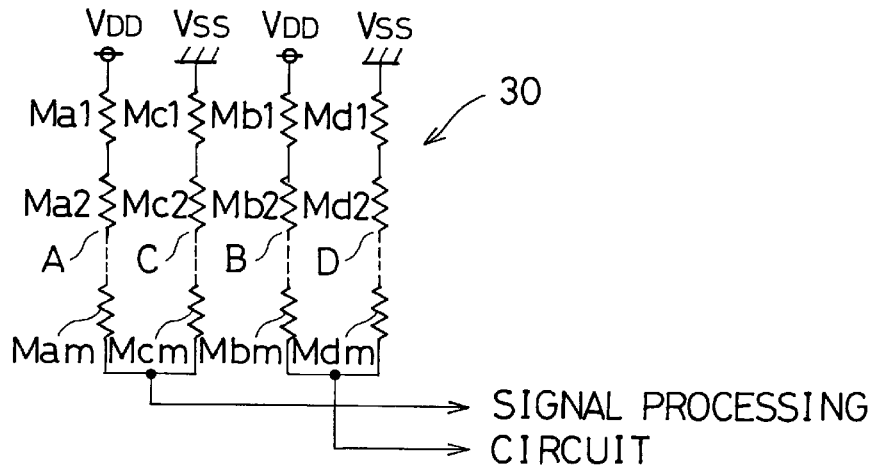
FIG. 17 is a schematic diagram showing an equivalent circuit of MR devices according to the embodiment shown in FIG. 12.

FIG. 16 shows the relation of relative phases of the array of the MR devices 205 on the second member 2 and the first member 1 in the case of N=0. MR devices Ma1, Ma2, . . . , Mam with a phase of 0° of each set are connected as a magnetic detecting device A as a bridge member on the power supply VDD side as shown in FIG. 17. Likewise, MR devices Mc1, Mc2, . . . , Mcm with a phase of 180° are connected in series as a magnetic detecting device C that is a bridge member on the ground VSS side. Likewise, MR devices Mb1, Mb2, . . . , Mbm with a phase of 90° are connected in series as one magnetic detecting device B. MR devices Md1, Md2, . . . , Mdm with a phase of 270° are connected in series as one magnetic detecting device D. These detecting devices A to D are connected between the power supply VDD and the ground VSS, whereby a bridge is formed.

In reality, assuming that $\lambda$ =400 $\mu$m and the number of sets of MR device arrays m=5 to 6, the length of the region of the MR device arrays is 2 to 3 mm. Thus, the IC chip 204 should be structured in such a region as to cover the MR device arrays.

Figure 18:
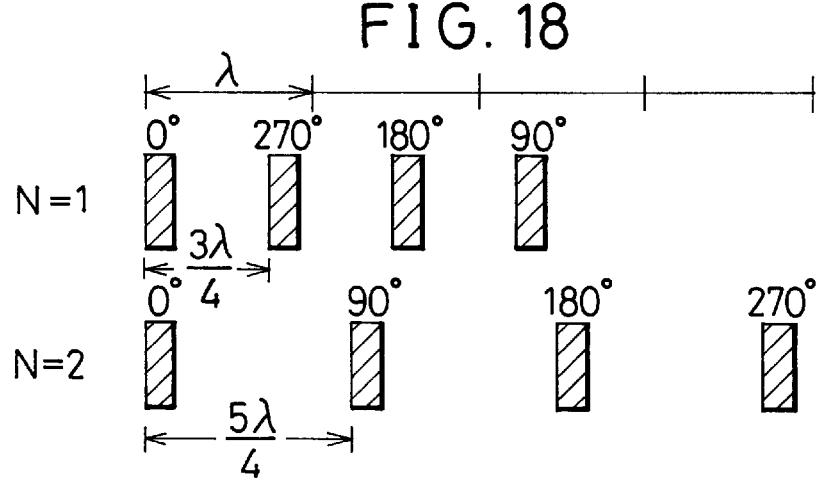
FIG. 18 is a schematic diagram showing other examples of the arrangement of an MR device array.

FIG. 16 shows the case of N=0. FIG. 18 shows the relation between the magnetizing pitches $\lambda$ and the arrangement of MR devices in the case of N=1 and 2. In other words, in the case of N=1, the MR device pitches are 3$\lambda$/4. In the case of N=2, the MR device pitches are 5$\lambda$/4. As is clear from FIG. 16, in the case that the magnetizing pitches $\lambda$ are small, when N is increased, the precise machining conditions of the MR devices are alleviated.

As described above, since MR devices with the same phase of the m sets of MR device arrays are connected in series, the impedance of each bridge member becomes high. Thus, when the voltage of the power supply is constant, the current is decreased. Consequently, the power consumption is reduced. When the MR devices deviate, the magnetizing pitches of the first member 1 deviate, or the intensity of the magnetization deviates, they are equalized. Thus, it is not necessary to perform adjustments in the signal processing stage. In addition, it is not necessary to adjust resistance by a trimming method. Moreover, influences of deterioration of the intensity of magnetization, damage of the pattern of MR devices, and contamination of iron powder can be alleviated. Thus, stable characteristics can be obtained.

Figure 19A:
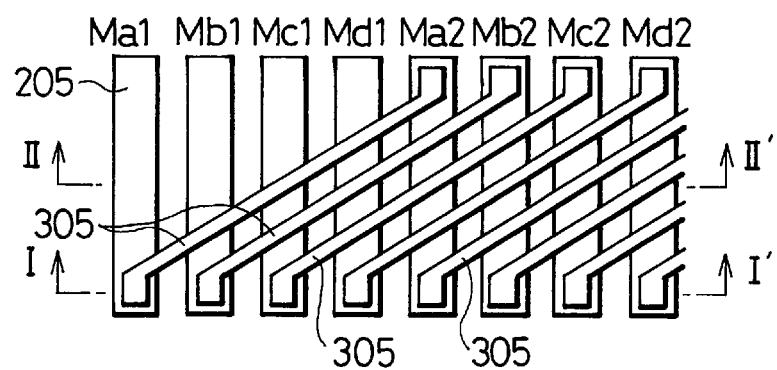
FIGS. 19A to 19C are schematic diagrams showing the structure of mutual wiring lines of the MR device array.
Figure 19B:
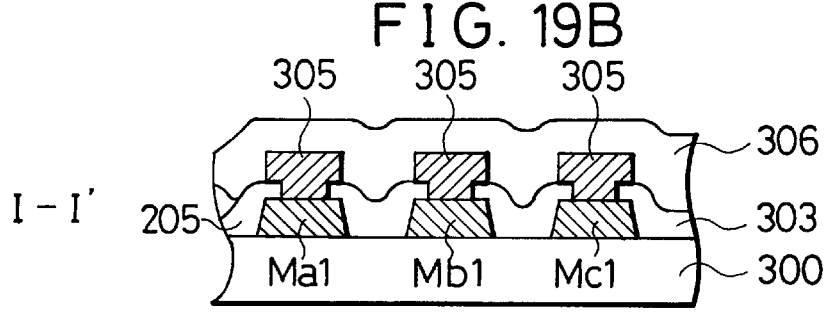
Figure 19C:
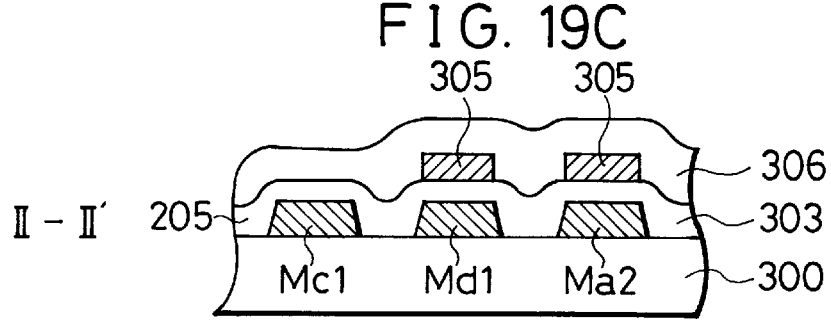

In FIG. 14, the metal wiring lines 305 that connects the MOS transistor 301 that is a device of the IC chip 204 and one MR device Ma1 are shown. However, when the MR device arrays are structured as shown in FIG. 16, the MR devices should be mutually connected. FIGS. 19A to 19C show an example of the structure of the wiring connections of the MR device arrays shown in FIG. 16. FIG. 19A is a plan view showing the MR device arrays. FIG. 19B is a sectional view taken along line I—I' of FIG. 19A. FIG. 19C is a sectional view taken along line II—II' of FIG. 19A. In this example, with the metal wiring lines 305 shown in FIG. 14 and metal wiring lines 304 on the same layer, MR devices with the same phase of the MR device arrays shown in FIG. 16 are connected. The metal wiring lines 305 are coated with a protection film 306.

Since the metal wiring lines 305 equally traverse the MR devices 205 opposite to the first member 1, the metal wiring lines 305 do not adversely affect the detection of the variation of the magnetization.

Figure 20:
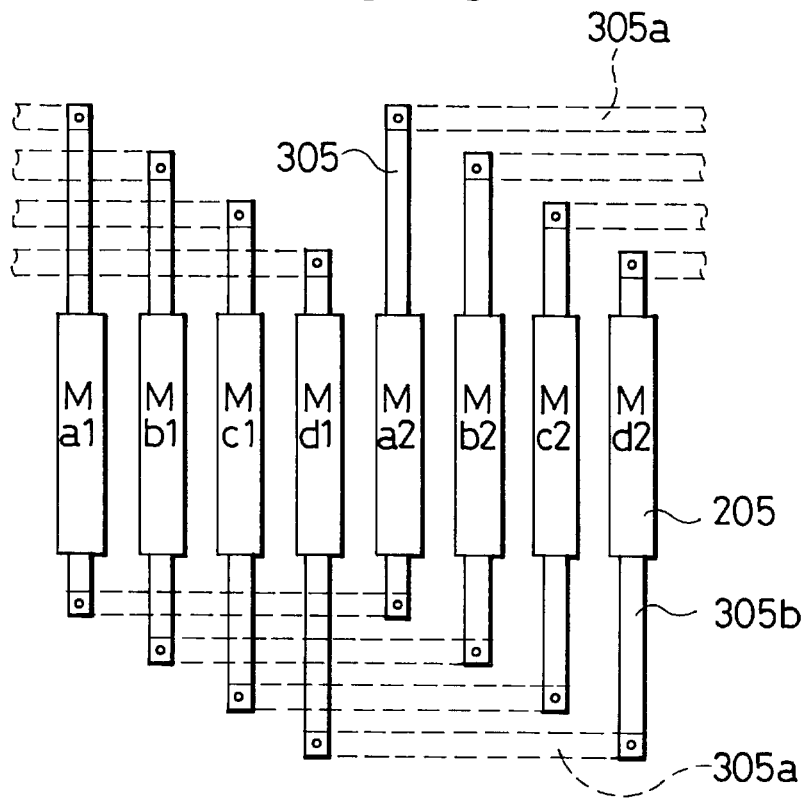
FIG. 20 is a schematic diagram showing another example of the structure of mutual wiring lines of the MR device array.

FIG. 20 is a schematic diagram showing a two-layered wiring structure of wiring lines of MR devices 205. With horizontal wiring lines 305a on a first layer (denoted by broken lines) and vertical wiring lines 305b that connect the wiring lines 305a and MR devices 205 on a second layer (denoted by solid lines), MR devices 205 with the same phase are connected in series. Although the wiring process becomes complicated, the MR devices can be mutually connected without need to traverse the wiring lines on the MR devices 205.

Alternatively, the vertical wiring lines 305b may be patterned with a magnetoresistance film that is the same material as the MR devices 205 as a first layer along with the MR devices 205. In this case, the horizontal wiring lines 305a denoted by broken lines are formed as a second layer. In this case, since two wiring layers other than the MR devices are not required, the wiring process becomes simple. Even if the vertical wiring lines are composed of the same film as the MR devices, when the lengths of the vertical wiring lines 305b are the same as shown in FIG. 20, they do not affect the detection of the variation of the magnetic field.

FIG. 20 shows only serial wiring connections of the MR devices as with the structure shown in FIG. 19. However, in reality, as described in FIG. 17, wiring lines of bridge circuits of four detecting devices A, B, C, and D of which the MR devices are connected in series are required.

Figure 21A:
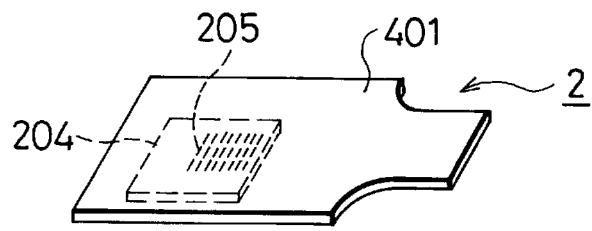
FIGS. 21A and 21B are schematic diagrams showing another example of the mounting structure of an IC chip.
Figure 21B:
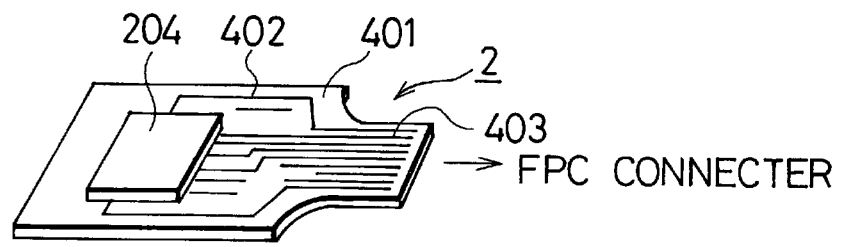

The mounting structure of the IC chip 204 may be modified in various manners. FIGS. 21A and 21B are perspective views showing a FPC substrate 401 used as a second member 2. FIG. 21 A shows a surface opposite to a first member (not shown). FIG. 21B shows the reverse surface of FIG. 21A. An IC chip 204 on which the MR devices 205 are integrally disposed is disposed on the rear surface of an FPC substrate 401 where wiring lines 402 and input/output terminals 403 are printed on the front surface thereof.

Thus, the IC chip 204 and the MR devices 205 are disposed opposite to the first member through the FPC 401 substrate. Consequently, the circuit devices can be effectively protected from contamination and so forth.

The mounting structure shown in FIG. 21 can be accomplished with a TAB substrate as well as an FPC substrate. In addition, this structure can be also accomplished with a glass epoxy substrate, a glass substrate, a ceramic substrate, or the like.

Figure 22:
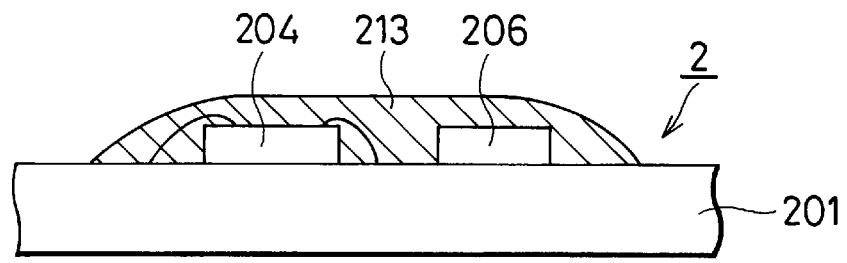
FIG. 22 is a sectional view showing another example of the mounting structure of the IC chip.

FIG. 22 is a sectional view showing a structure similar to that according to the embodiment shown in FIG. 12. The structure shown in FIG. 22 is accomplished with an insulation substrate 201 that does not have a concave portion. In this case, a resin 213 that seals an IC chip 204 is formed in a convex shape.

Figure 23A:
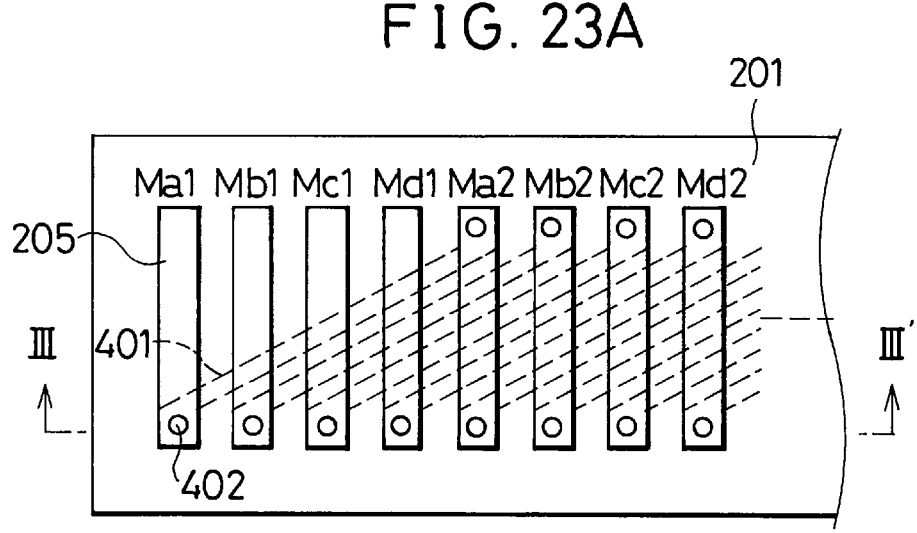
FIGS. 23A and 23B are schematic diagrams showing the structure of an MR device array according to another embodiment of the present invention.
Figure 23B:
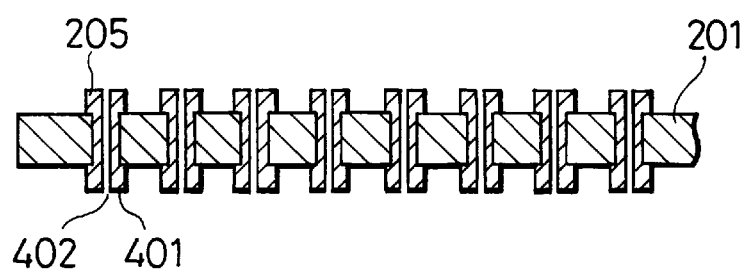

In the above-described embodiments, an MR device array is integrally formed on an IC chip. However, the present invention is not limited to such a structure. Instead, the present invention is applied to a structure of which an MR device array is formed on an insulation substrate as a second member independent from a signal processing circuit. FIGS. 23A and 23B show an example of such a structure. FIG. 23A is a plan view showing the structure. FIG. 23B is a sectional view taken along line III—III' of FIG. 23A. In this embodiment, MR devices 205 are formed on an insulation substrate 201 having through-holes 402. The insulation substrate 201 is composed of ceramic or the like. Wiring lines 401 that connect MR devices 205 in series are formed on the rear surface of the insulation substrate 201. An IC chip (not shown) is disposed on the rear surface of the insulation substrate 201 as a surface opposite to the first member 1.

In the above-described embodiments, a detecting circuit of which four-phase MR devices are connected in series are connected as a bridge circuit was described. However, the present invention can be also effectively applied to another detecting system of which the difference of output signals of MR devices with phases that differ from each other by 180°.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

The entire disclosure of Japanese Patent Application No.8-291794 filed on Nov. 1, 1996 including specification, claims, drawings and abstract are incorporated herein by reference in its entirety.

What is claimed is:

1. A magnetic encoder, comprising:
   a first member having N magnetic pole portions and S magnetic pole portions alternately arranged in predetermined pitches;
   a second member, disposed opposite to said first member and being relatively movable with respect to said first member, said second member having at least four magnetoresistance devices with phases that differ by 90°, each corresponding to the pitches of the magnetic pole portions of said first member;
   a displacement detecting circuit for obtaining a difference between output signals of the magnetoresistance devices with phases that differ by 180° to output two-phase sine wave signals, amplitudes of the two-phase sine wave signals being varied corresponding to the relative movement of said first member and said second member, said displacement detecting circuit being driven by a DC power supply;
   a signal processing circuit for generating two-phase square wave signals based on the two-phase sine wave signals obtained by said displacement detecting circuit;
   a counter for counting the two-phase square wave signals generated by said signal processing circuit to obtain a relative position of said first member and said second member; and
   a switch circuit for intermittently turning on/off an output of the DC power supply to said displacement detecting circuit corresponding to a first clock having a predetermined frequency.

2. The magnetic encoder according to claim 1,
wherein said displacement detecting circuit is a bridge circuit in which respective two devices of at least four magnetoresistance devices with phases that differ by 180° are connected in series.

3. The magnetic encoder according to claim 1,
wherein said displacement detecting circuit has:
   a sense circuit in which at least four magnetoresistance devices are connected to the DC power supply through respective current sources, the sense circuit having output terminals that are the connection nodes between the magnetoresistance devices and the current sources; and
   two differential circuits for obtaining the difference of output signals obtained at the output terminals of the sense circuit with phases that differ by 180°.

4. The magnetic encoder according to claim 1,
wherein said signal processing circuit has:
   a pair of sample hold circuits for sampling and holding the two-phase sine wave signals obtained from said displacement detecting circuit by the first clock;
   a pair of comparators, intermittently activated by a second clock with a phase delayed from the phase of the first clock, for comparing output signals of the sample hold circuits with a constant reference voltage to obtain binary data; and
   a pair of flip-flops for receiving the binary data from the comparators to output the two-phase square wave signals.

5. The magnetic encoder according to claim 4,
wherein each of said sample hold circuits has an amplifying circuit disposed at one of an input terminal and an output terminal thereof, the amplifying circuit being activated by the first clock.

6. The magnetic encoder according to claim 1,
wherein said signal processing circuit has:
   a pair of sample hold circuits for sampling and holding the two-phase sine wave signals obtained from said displacement detecting circuit by the first clock; and
   an interpolation circuit for interpolating output signals of the sample hold circuits to obtain the two-phase square wave signals, the interpolation circuit being intermittently activated by a second clock with a phase delayed from the phase of the first clock.

7. The magnetic encoder according to claim 1,
wherein said signal processing circuit has:
   a pair of comparators for comparing the two-phase sine wave signals received from said displacement detecting circuit with a predetermined reference voltage to obtain binary data, the comparators being intermittently activated with the first clock; and
   a pair of flip-flops for receiving the binary data from the comparators to output the two-phase square wave signals.

8. The magnetic encoder according to claim 1,
wherein said signal processing circuit, said counter, and said switch circuit are disposed on said second member, and
wherein said second member has a display that displays output data of said counter.

9. A magnetic encoder, comprising:
   a first member having N magnetic pole portions and S magnetic pole portions alternately arranged in predetermined pitches;

a second member, disposed opposite to said first member and being relatively movable with respect to said first member, said second member having at least four magnetoresistance devices with phases that differ by 90°, each corresponding to the pitches of the magnetic pole portions of said first member;

a displacement detecting circuit for obtaining a difference between output signals of the magnetoresistance devices with phases that differ by 180° to output two-phase sine wave signals, amplitudes of the two-phase sine wave signals being varied corresponding to the relative movement of said first member and said second member, said displacement detecting circuit being driven by a DC power supply;

a signal processing circuit for generating two-phase square wave signals based on the two-phase sine wave signals obtained by said displacement detecting circuit; and a counter for counting the two-phase square wave signals generated by said signal processing circuit to obtain a relative position of said first member and said second member, wherein a plurality of sets, each of which is composed of at least four of the magnetoresistance devices whose phases are 90° shifted from each other, are arranged, and wherein the magnetoresistance devices with same phase in the sets are connected as magnetic detecting devices in series.

10. The magnetic encoder according to claim 9, wherein the pitches P of the magnetoresistance devices on said second member are represented by $$P = (2N+1)\lambda/4 \ (N=0, 1, 2, \ldots)$$

where $\lambda$ is the pitches of the magnetic pole portions of said first member.

11. The magnetic encoder according to claim 9, wherein the four-phase magnetoresistance devices compose bridge circuits of which the magnetoresistance devices with phases that differ by 180° are connected in series.

12. The magnetic encoder according to claim 9, wherein said signal processing circuit is disposed in an IC chip disposed on said second member, and wherein said magnetoresistance devices are composed by patterning a magnetoresistance thin film formed on an insulation film that coats the IC chip.

13. The magnetic encoder according to claim 12, wherein said second member is an insulation substrate on which wiring lines and lead terminals are formed, the IC chip being disposed in a concave portion on a first surface of the insulation substrate, the first surface being opposite to said first member, the portion of which the IC chip is disposed being sealed with a resin in such a manner that the height of the portion is the same as the height of the peripheral portion of the insulation substrate.

14. The magnetic encoder according to claim 12, wherein said second member is a substrate having a first surface and a second surface, the first surface being opposite to said first member, the second surface having wiring lines and input/output terminals, the IC chip being disposed on the second surface.

* * * * *